United States Patent [19]

Craft

[11] Patent Number: 5,230,254
[45] Date of Patent: Jul. 27, 1993

[54] CORIOLIS MASS FLOWMETER WITH MULTIPLE VIBRATING TUBES

[75] Inventor: Donald W. Craft, Melrose, Mass.

[73] Assignee: Ametek Aerospace Products Inc., Wilmington, Mass.

[21] Appl. No.: 824,018

[22] Filed: Jan. 22, 1992

[51] Int. Cl.⁵ .............................................. G01F 1/84
[52] U.S. Cl. ................................................. 73/861.38
[58] Field of Search .......................... 73/861.37, 861.38

[56] References Cited

U.S. PATENT DOCUMENTS

| | | |
|---|---|---|
| 4,127,028 | 11/1978 | Cox et al. |
| 4,192,184 | 3/1980 | Cox et al. |
| 4,729,243 | 3/1988 | Friedland et al. |
| 4,814,680 | 3/1989 | Hulsing |
| 4,823,614 | 4/1989 | Dahlin |
| 4,879,910 | 11/1989 | Lew |
| 4,891,991 | 1/1990 | Mattar et al. |
| 4,911,020 | 3/1990 | Thompson |
| 5,090,253 | 1/1993 | Craft ................................ 73/861.38 |

Primary Examiner—Herbert Goldstein

[57] ABSTRACT

A Coriolis type flowmeter is described having 12 parallel flow tubes joined to a hub whose geometry is chosen to also perform the function of an inlet and outlet manifold. Plates are provided to interconnect and average the motion of the flow tubes as well as providing a platform for sensing Coriolis induced motion and inducing harmonic oscillations. Because of its symmetric geometry and balanced characteristics, the flowmeter is insensitive to vibration in any axis perpendicular to the axial axis of symmetry.

18 Claims, 4 Drawing Sheets

CORIOLIS MASS FLOWMETER WITH MULTIPLE VIBRATING TUBES

BACKGROUND OF INVENTION

1. Field of Invention

This invention relates to a flowmeter for measuring mass flow of generally fluent materials such as liquids, wherein the induced Coriolis force on the components of the flowmeter is correlated to a measurement of mass flow.

2. Description of Related Art

Mass flowmeters (or direct mass flowmeters) have sensing means which respond to mass flow rate as compared to volume flow rate. Other types of flowmeters employ, for example, sensing means which respond to differential pressure or fluid velocity. If a need arises to measure mass flow rate with such devices, a separate measurement of fluid density must be performed and an inference made about the flow distribution pattern in the cross section of the meter. Thus for reason of measurement simplicity alone, direct mass flowmeters are very desirable.

In practice, the mass flow measurement is much more useful than other types of flowmeters which measure volume flow rate because chemical reactions require blending of proportional mass (not volume) of ingredients and product specifications generally refer to mass percentage of ingredients rather than volume percentage. Thus the ability to measure mass flow directed rather than volume flow represents a major advantage of direct mass flow measurement over other techniques.

Coriolis flow meters (CFM's) are direct mass measuring flowmeters. They detect the Coriolis force and use the influence of a pattern (or couple) of such forces upon flow tubes carrying the fluid within the meter. Devices disclosed to date employ one or two flow tubes which may split the fluid stream and carry a fraction of the flow of fluid or may carry the fluid stream serially through both tubes. The flow tubes are typically vibrated by a magnetic force coupling between a drive coil and a permanent magnet. The flow tubes are driven at their resonant natural frequency in a given mode of vibration. Coriolis forces are generated between the fluid and the vibrating tubes. The forces are proportional to the mass flowrate within the tubes. The sum of the moments produced by the distributed Coriolis forces cause the tubes to be twisted or deflected in opposition to the normal motion that the tubes would have at zero flowrate. The twisting can be measured as a time delay or a phase shift in the relative motion of the tubes. The time delay, or phase shift is proportional to the mass flowrate.

U.S. Pat. No. 3,276,257 describes a prior art mass flowmeter that operates using Coriolis forces. The mass flowmeter described in that patent consists generally of a circular tube (forming a reference plane) that is excited to vibrate in a direction normal to the reference plane in which it is at rest. The fluid whose mass flow rate is to be measured is made to flow through the vibrating tube. The Coriolis force couple on the tube resulting from the fluid flow causes the tube to twist. For a given geometry and amplitude of induced vibration, the angle of twist of the tube induced by the Coriolis force couple is proportional to the true mass flow rate. The angle of twist is determined by the time difference between the instant that one side of the tube crosses a given reference plane and the instant that the opposite side crosses the same reference plane. To accomplish this measurement, two sensors are mounted on opposite sides of a pipe, through which the fluid flows in opposite directions. A phase shift is measured between the output of two sensors. This phase shift is proportional to the Coriolis force couple accelerating the tube, and therefore proportional to the mass flow through the meter.

The designation of the Coriolis forces as "couples" is inherent in the structure of the flow tubes in a meter. For each part of a flow tube which is, during the vibration of the tube, not parallel with the axis of motion (rotation) of the vibrated tube, a Coriolis force is produced. The force acts through the body of the fluid, which in turn will produce pressure on the flow tube wall, thereby inducing motion in the tube itself. The magnitude of the Coriolis force is proportional to the mass flow rate, the angular velocity of rotation, the sine of the angle between flow direction within the element and the direction of the rotation vector. The Coriolis force typically becomes a force couple because the one flow tube has regions with opposite flow directions of fluid flow. In the regions of the tube where the flow is in opposite directions, two Coriolis forces concurrently applied to the structure will be in opposite directions, therefore the term "force couple" is generally employed.

As used above, and throughout this application, the term "motion" is used to describe change in position, velocity, and acceleration of a point or aggregate of points on the flow tube(s) or any time-derivative or time-integral of these variables. Motion is observed over the time of a typical single oscillatory cycle while performing a flow measurement. The flow tube's motion is periodic and any one of these physical variables for any point on the flow tube can be determined.

Another concept in this application describes the induced vibratory motion in the flow tubes of the Coriolis flowmeter. This is the requirement that the vibration of the fluid carrying tubes be maintained at a "natural frequency" of a mode of free (unforced) vibration.

The tubes are driven at the natural frequency in a Coriolis mass flowmeter. This requires that the periodic driving force lag the periodic displacement of the flowtube by precisely 90°. In other words, the periodic force and the motion can be described by the following equations:

$$X = X_O \sin(\omega t) \tag{1}$$

$$F = F_O \cos(\omega t) \tag{2}$$

where
- $X$ = Deflection from the neutral plane (displacement)
- $X_O$ = Maximum deflection
- $F$ = Periodic driving force
- $F_O$ = Maximum value of the periodic force
- $\omega$ = Frequency of vibration, radians/sec
- $t$ = Time, seconds U.S. Pat. No. 3,355,944 to Sipin expands on the above concepts. Here, a U-shaped tube is vibrated about an axis in the plane formed by the tube, passing through the open ends of the U section. When a liquid material flows through the tube, a Coriolis force couple acts on the inlet and the outlet sections of the tube (the legs of the U) located at right angles to the axis about which the tube is vibrated. This couple is caused by the Coriolis force being induced because of the opposite direction of flow of the material in these inlet and outlet sections. This force couple twists (or torques) the U-shaped tube about an axis which is in the plane defined by the U-shaped tube, and which is parallel to the inlet and outlet sections and equidistant between them. As the U-shaped tube is vibrated back and forth, the Coriolis force couples will oscillate back and forth as the angular velocity alternatively reverses direction.

The Sipin Patent describes a one tube Coriolis flowmeter design. There is a distinction between Coriolis flow meters of one and two tube design. An example of a two tube design is shown is U.S. Pat. No. 4,192,184 to Cox et al, issued Mar. 1, 1980. In the two tube design, the tubes are symmetrical and the measurement of flow tube deflection and motion is done between the two vibrating tubes, i.e. the reference for performing the measurements on one tube is the other tube. Conversely, a single flow tube device must use a reference which is not a tube containing fluid to be measured. The reference can be a tube without process fluid, or some other stationary object. Because the reference is critical in any measurement, a major consideration in single tube units is mounting requirements to eliminate influences from floor vibrations or pressure pulsations in the process fluid.

As the Cox Patent describes, in the two tube design, depending on direction of flow, when the tube pairs are induced to vibrate, they will alternately come close together to a minimum spacing, and then separate to a maximum spacing. Therefore, the angular velocity vector for one tube will always be opposite from the angular velocity vector of the other tube. If the flow through the two tubes is the same, that is if the flow near the inlet sections are both in a first direction, and the flow near the outlet sections are both in an opposite direction, then each of the tubes will be subject to opposing torques with respect to an axis in the plane formed by the tube. This effect is caused because of the opposite angular velocity vectors in the inlet and outlet of the tubes. This two tube arrangement cancels any net Coriolis induced force on the mounting means for the tube pairs.

Figure 1:
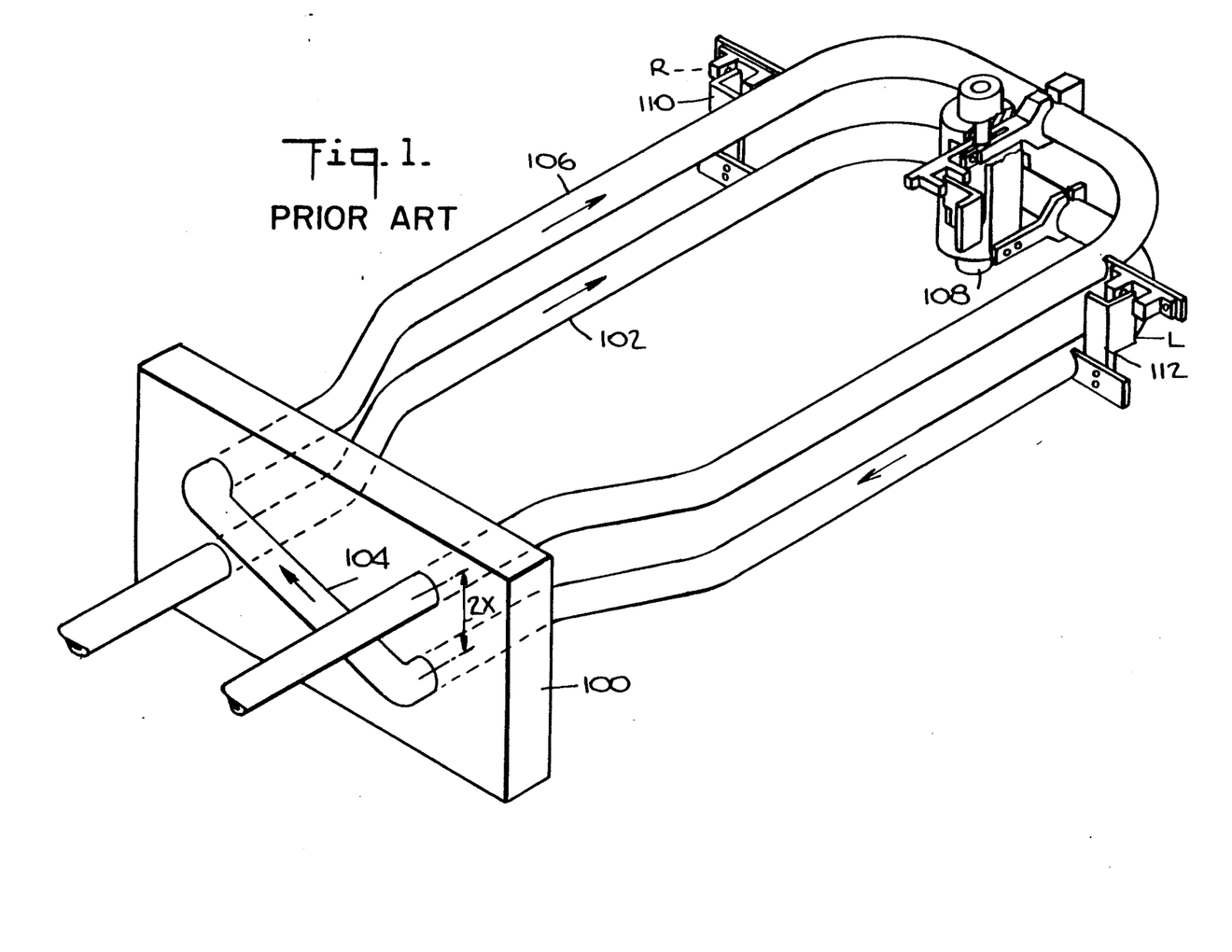
FIGS. 1 and 1A show a prior art two tube Coriolis flowmeter detailing the relative motion of the vibrating tubes as well as the location of motion sensor and driver operation.

To better explain the motion in the two tube design, and illustrate relevant flow tube motion in the present invention, FIG. 1, corresponds to FIG. 1 of the Cox Patent, with renumbered elements and shows the fluid elements of a dual U-tube Coriolis flowmeter having parallel flow paths. The ends of each U-tube are rigidly attached to a support block 100. After the fluid passes through the first U-tube 102, a return connection 104 within or attached to the support block 100 allows the fluid to enter the second U-tube 106. The return connection 104 is configured such that the fluid flow paths are parallel in each U-tube 102, 106.

Typically, velocity or displacement sensors 110, 112 are attached between, and on, each leg of the "U-tubes". The difference in the displacement measured by the two sensors is proportional to the relative angle of twist of the two U-tubes 102 and 106.

An electromagnetic driver 108 is attached between the ends of the two "U-tubes" to vibrate the tubes in opposite directions to each other at the natural resonant frequency of the tubes. A phase locked loop (PLL) feedback system is used to precisely drive the oscillating means to induce vibrations in the "U-tubes" at (or near) their resonant frequency. A detailed description of a known means for driving and sensing the motion of flowmeter tubes in a Coriolis type flowmeter is described in U.S. Pat. No. 4,814,680 to Hulsing issued Mar. 21, 1989.

Figure 1A:
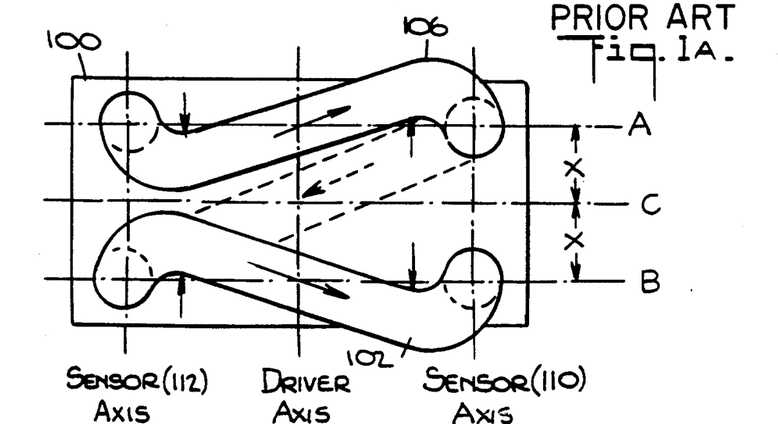

The U-tube motion of the tubes in FIG. 1 under the influence of the Coriolis force is detailed in FIG. 1A. Here, the end view of the tubes shows the effect of a finite acceleration and deceleration due to the Coriolis couple created by the fluid flowing through the tubes causing the U-tubes to twist in opposite directions to each other. The sensor axis in FIG. 1A shows where sensors 110, and 112 are placed to sense the changing distance between the tubes. The driver axis, is where driver 108 is placed to induce vibratory motion in tubes 102, 106.

The explanation of the motion of the tubes in FIG. 1A is best understood by the introduction of two reference planes associated with the two flow tubes shown in FIG. 1. Plane A is defined by (top) flow tube 106, while plane B is defined by (bottom) flow tube 102. Both planes pass through the center of the tubes 102, 106. Both planes are, at the instant represented by FIG. 1A, 2X apart with the distance X corresponding to one half the spacing between tubes 102 and 106 when they are not being vibrated, i.e. at rest. Distance X at this instant of time also defines plane C, which is equispaced from planes A and B, and parallel to them. The mounting distance X between the two U-tubes shown in FIG. 1A is not particularly important—the tube deflections away from the neutral plane are. Because of the instant of time FIG. 1A represents, and the definition of planes A and B, the distance 2X also corresponds to the mounting distance 2X between the centers of tubes making up flow tubes 102 and 106, and shown with respect to block 100 in FIG. 1.

When the vibrating tube 102 or 106 passes through their respective neutral planes, the motion of each element of the tubes is at the maximum velocity in the periodic motion the tube. At the same time, the maximum angular velocity of the tubes is attained. The magnitude of the distributed Coriolis forces is also at a maximum when the vibrating tubes pass through their respective neutral planes A or B.

The periodic forces which drive the tubes 102 and 106 at their resonant frequency, cause the tubes to deflect approximately 2,000 times the magnitude of deflection that the tubes would be subject to compared with the same forces applied as a static force. This is due to the relatively small amount of damping within the tube material. The Coriolis forces are also at a maximum when the tubes pass through the neutral plane, but the Coriolis forces are not at a resonance condition and the deflection produced by these forces is only 1 to 2 times the deflection that the Coriolis forces would produce as steady state forces. However, the twisting moment produced by the Coriolis forces is greater than the moment needed to drive the tubes in resonance. Consequently, the small amplification effect of the Coriolis forces is partially compensated by actually having a higher magnitude effect than the driving force under static conditions.

When the tubes 102, 106 are vibrated in a sinusoidal manner, and there is no flow in the tubes, the distance X will increase and decrease equally and uniformly between sensor axes, i.e. the sensed locations associated with sensors 110 and 112 will move up and down equally closer or further with respect to plane C. In this assumed no flow situation, the average distance X will correspond to the point at which the sinusoidal oscillating velocity of the tubes will be at its maximum.

Now a flow of material is assumed into the flow tubes. Assume the tubes at this instant are moving apart, and planes A and B would have been X away from C if there was no flow. Because of the Coriolis force couple, the locations associated with the axis of sensor 110 will move apart, away from plane C more than the expected distance X, while the location associated with sensor 112 will be closer to plane C than expected distance X.

The effect of the Coriolis force couple on tube 106 is to twist it counterclockwise as shown in FIG. 1A, while tube 102 is twisted clockwise. The reason the Coriolis force couples applied to tubes 102 and 106 are in different directions is because the instantaneous velocity vector of the tubes perpendicular to planes A and B is of opposite signs, i.e., tube 102 is moving in the opposite direction of tube 106 with respect to plane C. Since the fluid flow is in the same direction in both tubes 102 and 106 the Coriolis forces exercised on the tubes will be of opposite direction. This Coriolis force induced twisting shown in FIG. 1A is a periodic motion which occurs at the same frequency as the tube resonant frequency. When the U-tubes move away from each other, during the next half cycle of the periodic motion, the twisting due to the Coriolis force couple will be in the opposite direction, i.e. the spacing at sensor 110 will be a minimum while the spacing between 106 and 102 at 112 will be at its maximum.

This motion of the tubes can better be understood by referring to actual examples of physical characteristics of commercial U-tube type Coriolis flowmeters. As previously described, the true mass flow rate through the U-tubes is proportional to the relative angle of twist between the tubes. The magnitude of the deflections, shown in FIG. 1A, is exaggerated for illustration purposes. Under typical operating conditions, the maximum deflection at the ends of the U-tubes for a tube length of about 70 times its diameter, due the oscillatory motion alone, (the quantity X in FIG. 1A), is typically about 0.1 inches. In contrast, the relative deflection due to Coriolis force twisting is on the order of 0.005 inches.

Having completed the explanation of the effect of the Coriolis forces on the flow tubes, some other important factors of flowmeter operation will be considered.

First, pressure drop between the input and output of the flowmeter is a major factor in many Coriolis flowmeter applications and should be minimized. In order to keep the pressure drop across the flowmeter within the limits placed by the available pumping capacity in the line, it is necessary that the flowmeter does not introduce an excessive pressure drop, i.e. the meter should have a large diameter and short flow tube, or, in the alternative, multiple parallel flow tubes sharing the overall flow. This minimizes the pressure loss associated with the introduction of the meter in the path of the fluid flow.

Second, the size of the Coriolis flowmeter itself should be minimized. The primary disadvantage of the Coriolis flowmeters that are currently being manufactured for fuel custody transfer and the process control industry is that the flowmeters are large and heavy compared with other types of flowmeters. The reason for the large size and weight of the contemporary Coriolis flowmeters is that the flow paths through the U-tubes are in series. To keep pressure drops across the meter low, the tubing must be of large diameter. Once a large diameter tube has been selected, the tubes must be made long in order to achieve enough movement at the ends of the tubes to permit measurement of Coriolis induced deflection. Long length of the tubes implies a relatively large flowmeter size.

Third, the tolerance of the Coriolis flowmeter to interference from acoustic waves or external vibrations generated by pumps and other process equipment should be maximized. Such interference can cause considerable deterioration in the accuracies of Coriolis flowmeter measurements especially if these interfering vibrations are periodic and have frequencies close to those of the frequency induced by the Coriolis forces. In a high interference environment, the Coriolis flowmeter may lose the ability to distinguish between motion caused by such disturbance or from a flow rate change. It is therefore desirable to minimize meter sensitivity to such acoustic disturbances as well as typical vibrations encountered in an industrial environment.

Fourth, the meter should be capable of tolerating a wide range of operating temperatures. This implies two considerations. First, the pipes of the flowmeter constitute a tuned mechanical assembly whose resonant frequency is meant to be relatively stable for accurate measurements. Adding mass to an oscillatory system will change its natural frequency (detune the assembly). This means that when mass flow rate changes, or unknown tube mass changes are introduced, the flow readings will be affected. Such unknown mass changes can come from unknown amounts of condensate being deposited on the pipes of a flowmeter when the temperature of the flowmeter drops below the dewpoint of the surrounding environment. When this condition is reached, water will condense from the air onto the external surfaces of the tuned pipes. Condensation on the tubes would produce an imbalance in the vibration characteristics since the condensation would not be uniform and the tube vibration would cause the condensate to agglomerate as well as "dance" around the vibrating tubes. The unknown mass of the condensate is now added to the original mass of the pipes thereby detuning the assembly and introducing errors in the flowmeter.

The second aspect of tolerating a wide range of operating temperatures is the adjustment of the readout of the meter because of the changes in the structure of the Coriolis flowmeter related to temperature. As the temperature changes the pipes of the meter, their stiffness and therefore resonant frequency will change. This needs to be compensated for to assure that the readout of Coriolis force couple induced motion is properly correlated to the actual flow rates through the meter.

SUMMARY OF THE INVENTION

It is therefore an object of this invention to provide a Coriolis flowmeter capable of high volume flow rates with minimal pressure drop having reduced weight and volume.

It is a further object of the invention to provide a flowmeter with reduced sensitivity to external vibration.

It is yet another object of the invention to provide a Coriolis flowmeter having multiple flow tubes.

Yet another objective of this invention is to minimize the number of sensors and drivers needed to sense the Coriolis related motion of a multi-tube flowmeter assembly.

It is yet another objective of the present invention to eliminate the detuning influence of the presence of a condensate on the resonant frequency of the flowmeter and therefore on its accuracy.

Yet another objective of the present invention is to provide an integral signal conditioning unit that compensates the output of the readout for temperature variations of the meter assembly.

Further objectives and advantages of the invention will become readily apparent as the description thereof proceeds.

The various objectives and advantages of the invention are realized in an arrangement where the Coriolis type flowmeter consists of a plurality of tubes arranged in two or more sets with each set of tubes supported and interconnected by supporting plates. The tubes in each set are preferably equally spaced circumferentially about the axis of a hub. The hub also acts as a distribution and collection manifold for the flow of material through the multiple tubes, as well as a means for mounting the flowmeter into the path of fluid flow.

Expanding on this fundamental concept, in one embodiment of the invention, a Coriolis flowmeter has 12 tubes divided into two sets of 6 tubes each, with each 6 tube set supported by two separate plates, i.e. two pairs of plates support all twelve tubes. The first pair of plates interconnect alternatively each of the first set of tubes, that is, the first, third, fifth, seventh, ninth, and eleventh tube, while the second pairs of plates interconnects the second set of tubes, that is, the second, fourth, sixth, eighth, tenth, and twelfth, tube. The Coriolis induced and vibratory forces in all tubes cause the plates to rotate in opposite directions. Thus, the Coriolis force is determined by simply measuring the displacement between a pair of adjacent plates. The assembly of tubes and plates are balanced both statically and dynamically around the axial axis of symmetry. Because of this, balanced state external vibration at right angles to the axial axis of symmetry will not influence the operation of the flowmeter.

A case covering, but not touching, the meter tubes provides a dry environment for the vibrating, tuned flow tubes and precludes condensate from ambient air from adding unknown mass to the vibrating tubes. A temperature sensor, either external to the flowmeter or placed within the case, senses the temperature of the fluid monitored through the Coriolis flowmeter and operates in conjunction with the Coriolis deflection to flow conversion electronics to compensate the reported flow for the actual temperature of the Coriolis flowmeter.

DESCRIPTION OF THE PREFERRED EMBODIMENT

The present invention is a Coriolis flowmeter having a plurality of vibrating tubes arranged around a hub in two or more sets. Each set of tubes is interconnected by a plate. All of the tubes making up the Coriolis flowmeter share the material flow through the meter with the fluid flowing from the input to the output through all of the tubes. The plates provide both a platform for the driving means that induce vibratory motion in the tubes attached to the plates as well as for the sensing means detecting the slight changes induced by the Coriolis forces in the position of the tubes and plates.

In a simple example of above described Coriolis flowmeter, four flow tubes are equally spaced circumferentially, i.e., every 90 degrees around a hub. The four tubes make up two sets of two diametrically opposed pipes each. Each set of two diametrically opposed pipes are interconnected by a plate. These plates now provide a reference from which both the oscillatory driving means and the sensing means can operate.

Figure 2:
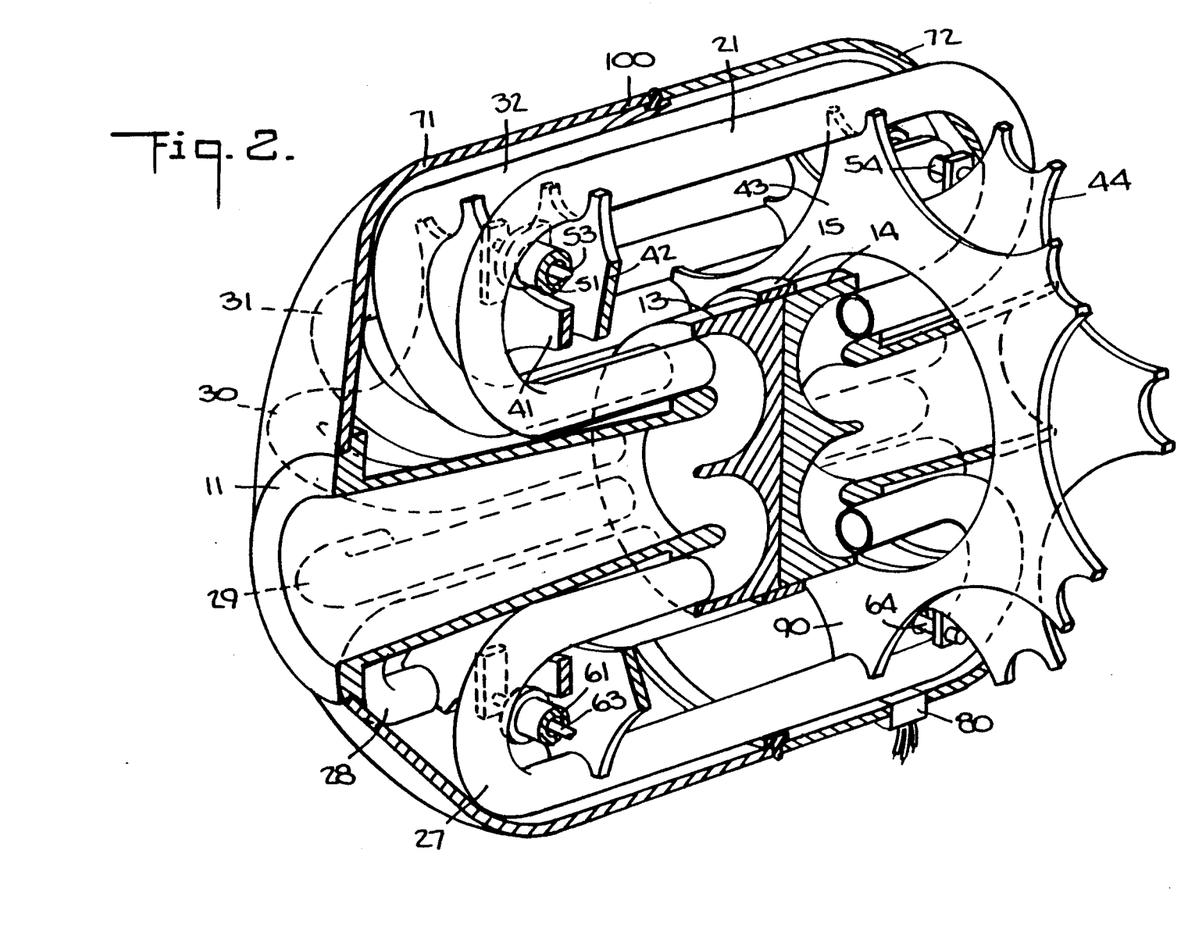
FIG. 2 is a perspective view of the preferred embodiment of the Coriolis flowmeter of this invention.
Figure 3:
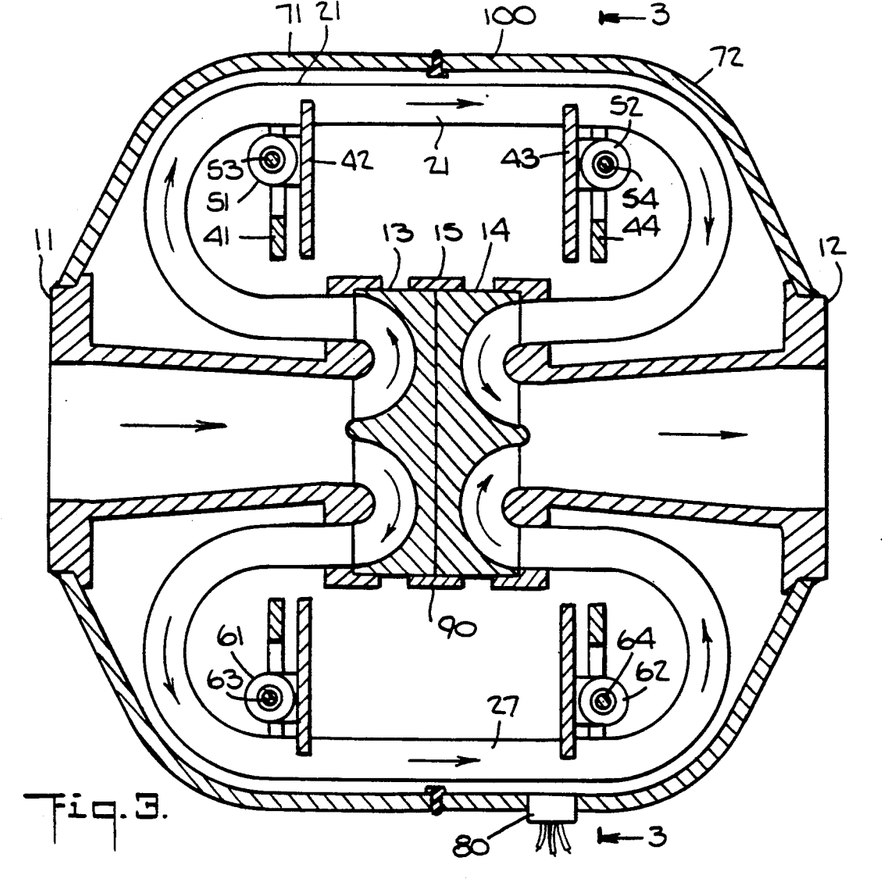
FIG. 3 is a side view of the Coriolis flowmeter of FIG. 2.
Figure 4:
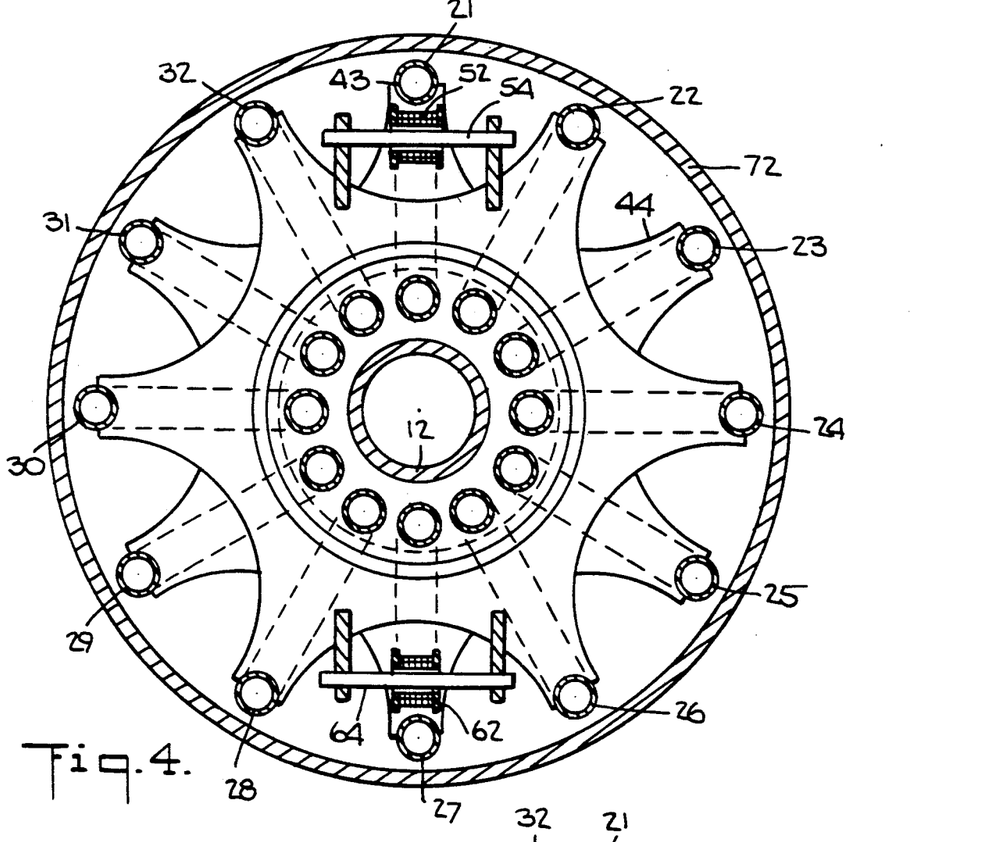
FIG. 4 is an axial view of the Coriolis flowmeter of FIG. 2 illustrating the circumferentially equidistant position of the 12 tubes with respect to the hub.

A specific example of a Coriolis flowmeter constructed in accordance with the invention is the multi-tube configuration shown in FIGS. 2, 3 and 4. Here a Coriolis flowmeter is illustrated where the total fluid flow is divided among 12 identical tubes 21, 22, 23, 24, 25, 26, 27, 28, 29, 30, 31, and 32. The twelve tubes 21 through 32 are equally circumferentially spaced (at equal angles) about the axis of a hub 90, which is made up of an intake manifold 13 to distribute the flow to meter tubes 21 through 32, an exhaust manifold 14 to combine the flow from meter tubes 21 through 32, and hub ring 15 to maintain axial alignment of intake manifold 13 and exhaust manifold 14. Hub 90 also supports inlet 11 and outlet 12 of the Coriolis flowmeter. Tubes 21 through 32, as well as inlet 11 and outlet 12 are brazed onto manifolds 13 and 14 of hub 90 to insure that no fluid can escape into the housing or bypass the tubes between the inlet 11 and the outlet 12. Manifolds 13, 14 are brazed axially to each other as well as to the hub ring 15 which is used to maintain concentricity of the manifolds 13 and 14. Inlet 11 and outlet 12 can be used to mount the flowmeter in the path of the fluid whose flow rate is to be measured.

Two pairs of plates 41, 42 and 43, 44 are connected to the outer perimeter of the tubes, and near each end of the straight portion of the tubes. Each plate 41,42,43, and 44 has six spokes, corresponding to one set of tubes, or half the total number of tubes. Each plate is brazed to alternate tubes on the inside of the circumference of each tube. The plates 41 through 44 have a large hole at the center to prevent the plates from touching or rubbing against the hub or tubes. The two plates making up each pair of plates 41, 42 and 43, 44 are spaced a slight distance from each other axially to prevent touching or rubbing between them. This space between plates allows driver coils 51, 52 to be attached to plate 42 and 43 respectively. Magnet assemblies 53, 54, working in conjunction with driver coils 51 and 52 are attached to the adjacent plates 41 and 44 respectively. There is a driver coil 51 and magnet assembly 53 located near the inlet of the Coriolis flowmeter and another driver coil 52 and magnet assembly 54 located near the outlet of the Coriolis flowmeter. Motion sensors 61 and 63 are located between plates 41, 42 and 43,44 respectively, and diametrically opposed to driver coils 51 and 52.

The two driver coils 51, 52 are typically connected electrically in parallel. An alternating current through the driver coils applied to both driver coils 51 and 52 causes the two pairs of plates 41, 42 and 43, 44 to torsionally oscillate in opposing directions around the axial axis of symmetry of the Coriolis flowmeter. The frequency of the current passing through the driver coils 51, 52 is adjusted until the mechanical resonant frequency of the vibrating tubes is reached. This frequency is typically in the range 80–300 Hz, and depends on the torsional stiffness of the combination of tubes 21 through 32 and plates pairs 41 through 44 as well as the effective mass of the vibrating components including the mass of the fluid within the tubes. The amplitude of the current passing through the driver coils 51 and 52 determines the magnitude of the torsional vibration of the tubes and plate assemblies.

Sensor coils 61, 62 which measure the angular displacement are described next. The functions of the sensor coil are three fold: a) to measure the maximum angular displacement of the tubes and plates with respect to each other, b) to maintain a sufficient vibratory displacement to make the Coriolis flowmeter function; and c) to limit this motion to prevent a destructive condition. Without this third function, the amplitude of vibration of the tubes and plates assemblies could become too great and the shear or bending stresses at the points where the tubes are attached to the hub could cause the tubes to fail prematurely.

The functions of the sensor coils 61, 62 are accomplished in concert with concentric magnets 63, 64 and the combination of the two is assembled between each pair of plates as shown in FIG. 3. The sensor coils 61, 62 and respective magnets 63, 64 are located between the plates in a location diametrically opposite the driver coils 51, 52 and magnets 53, 54 in order to achieve static and dynamic balance of the vibrating assemblies.

In operation, an alternating current is applied to the driver coils 51,52. This excites the 12 tube and plate assembly to establish the necessary vibratory motion. The motion at the tube and plate assembly itself is sensed by the sensor coils 61,62. The electrical output of the sensor coils is typically used to drive the input of an appropriate phase locked loop (PLL) circuit which is designed to lock onto the mechanical resonant frequency of the assembly, a concept well known in the art and described in U.S. Pat. No. 4,814,680 to Hulsing. The output of the phased locked loop (PLL) circuit is used to drive a suitable amplifier circuit and thus generate an alternating current with sufficient power input to the driver coils 51, 52 to cause the tube and plate assemblies to vibrate with a reasonable magnitude of angular displacement. The input from the sensor coils applied to the PLL circuit provides a feedback means for driving the tube and plate assembly at its resonant frequency.

In the alternative, linear variable differential transformers (LVDTs) could be used in place of the sensor coils 61, 62 and magnets 63, 64. LVDTs have the advantage of being able to measure the relative displacement between the two oscillating assemblies directly whereas the sensor coil and magnet assemblies produce a velocity output. The disadvantage of the LVDTs is that each requires a four terminal connection whereas the sensor coil only requires a two terminal connection. The LVDT's have two other advantages, namely:

(1) they can be connected differentially to measure the relative displacement between the set of plates 41, 42 near the inlet 11 and the set of plates 43, 44 near the outlet 12 and (2) they can be more readily shielded against external electromagnetic interference.

There are at least two driver coils and two sensor coils for the multiple tube configuration shown, however, there could be two driver coils and four sensor coils in each CMF. If there are two sensor coils spaced 180° apart on each set of plates, the coils can be connected such that extraneous signals due to external vibration or motion would be cancelled. Even more benefit from noise cancellation can be attained by mounting three (3) sensor coils spaced 120° apart on each set of plates.

Having explained the structure and operation of the subsystems associated with the 12 tube Coriolis flowmeter, now the overall operation of the Coriolis flowmeter can be described in detail. When fluid flows through the 12 tubes, the Coriolis forces cause the tubes 21 through 32 to twist in a periodic motion which is superimposed on the induced vibrating motion of the tube and plate assemblies. The twisting of the tube assemblies produces a difference in motion between the two sensor coils. This difference in motion is directly proportional to the Coriolis force and therefore to the total mass flow rate through all of the tubes.

Figure 5:
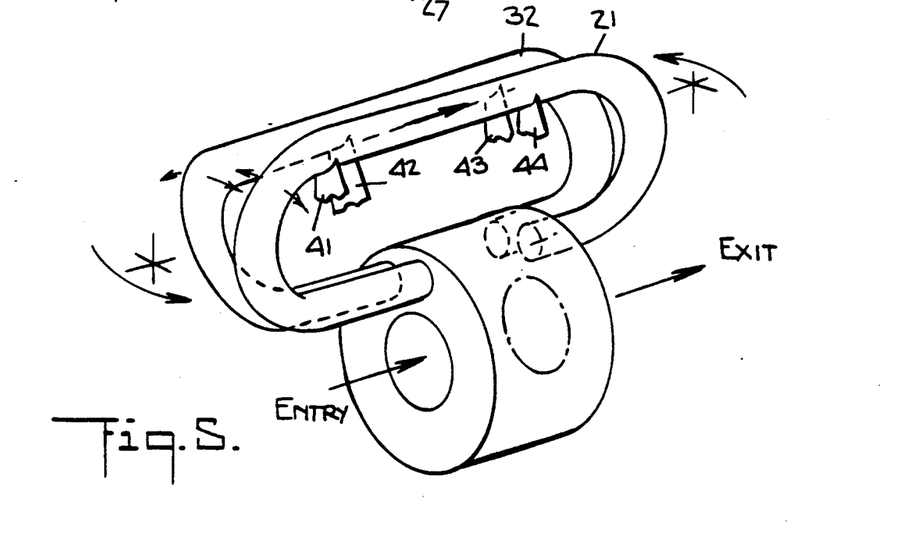
FIG. 5 shows the relative oscillatory motion induced in two adjacent tubes, one from each set of six shown in FIG. 2 as well as the direction of the Coriolis induced forces.

As an example of the operation of the 12 tube Coriolis flowmeter, consider the motion of two adjacent tubes 21 and 32 of the 12 tube assembly as shown in FIG. 5. The adjacent tubes 21 and 32 belong to the two separate sets of six tubes each, and are shown to oscillate, driven via their respective plates, out of phase with each other, i.e. the spacing between the walls of the two tubes will sinusoidally increase to a maximum and subsequently decrease to a minimum in the direction of arrows A. The Coriolis force shown will act to twist the two tubes in the direction of arrows B. This will induce a difference in the motion of the exit end as compared to the entry end of the flowmeter tubes 21 and 32. This difference imparted by the combination of forces from the 12 tubes is proportional to the Coriolis force and therefore to the mass flow through the meter.

There are distinct advantages to the structure of the present invention. The prior art dual tube Coriolis flowmeter shown in FIG. 1 is relatively insensitive to external vibration in certain directions, while it is sensitive to vibratory motion in other directions. In contrast, in the invention disclosed herein, the Coriolis flowmeter is insensitive to vibration on any axis which is perpendicular to the Coriolis flowmeter's axial axis of symmetry. The immunity to vibration is effectively provided because the moving (vibrating) parts (tubes and plates) are balanced. Thus, one advantage of the multiple tube configuration is that the symmetrical, balanced multiple tube Coriolis flowmeter have more tolerance to external vibration than the prior art two parallel U-tube Coriolis flowmeter.

This insensitivity to external vibrations also extends to vibrations parallel to the axial axis of symmetry. If the multiple tube Coriolis flowmeter assembly is subjected to external vibrations along the axial axis of symmetry, there will be no relative motion induced between the sensor coils and the magnets attached to the plates. Therefore, because the disturbance caused by the vibration is perpendicular to the direction of velocity or displacement detected by the sensor coils, and cannot be sensed, no signal is output from the sensors coils to influence the signal output as a function of Coriolis force.

Yet another advantage of the present invention is shown in FIGS. 2, 3, 4. Here a cylindrically shaped housing 100, made up of two halves 71, 72 encloses the 5 vibrating tubes 21 through 32. The housing halves are brazed or welded to the inlet and outlet connections as well as to each other to produce a hermetically sealed cavity outside of the tubes. The hermetically sealed cavity formed by the housing is filled with dry helium or a mixture of dry nitrogen and helium. The fill gas must be dry to prevent moisture condensation on the vibrating tubes when the Coriolis flowmeter is operated at low temperatures. Condensation on the outer surfaces of the tubes if allowed to form, will produce a change in mass and therefore an imbalance in the vibrating mass system. The dewpoint of the dry gas filling the cavity is below the lowest temperature of the fluid that is expected to flow through the CMF. The helium content of the inert gas mixture permits a helium leak check to test the hermetic integrity of the enclosure.

Signal access through the housing 100 is provided by a hermetic electrical connector 80 brazed in the wall of the housing to permit electrical connections to be made to the driver coils 51, 52 and sensor coils 61, 63 as well as provide connections to a platinum resistance temperature detector (PRTD). The PRTD is not shown in FIG. 2, and may be either internal or external to the enclosure and is used to sense the fluid temperature for appropriate temperature compensation of the measurement of the Coriolis force motion. As previously detailed, as the temperature of the fluid and thus the temperature of the Coriolis flowmeter changes, there are dimensional changes of tubes as well as changes in the modulus of elasticity of the tubes which causes the calibration of the Coriolis flowmeter to change as a function of temperature. These thermal effects on the calibration characteristics of the Coriolis flowmeter are essentially linear with temperature for the wide temperature operating range encountered in aircraft applications. A known signal conditioning unit attached to the output of the Coriolis flowmeter (not shown) determines the operating temperature via the PRTD and makes appropriate corrections such that the indicated mass flow rate is properly compensated for temperature.

Yet other advantages of the present invention are its reduced size as compared with the two U tube design of the prior art and the simplified mechanism for sensing the simultaneous motion in 12 tubes. The axisymmetric multiple tube design of the Coriolis flowmeter shown in FIGS. 2, 3, 4 significantly reduces the size and weight over contemporary Coriolis flowmeters because the flow through the meter is carried by multiple tubes. The central hub assembly 90 provides a compact manifolding arrangement as well as providing a means of dividing the flow equally among the tubes 21 through 32. The plates 41 through 44 provide a means of averaging the effects of the Coriolis forces among all of the tubes, and a means for sensing the motion in all 12 tubes simultaneously by using only one set of sensors between the plates.

Yet another way of implementing the invention is to also provide node plates. The node plates (not shown) are provided in addition to the plates 41 through 44. These are thin plates (e.g., 0.06 inches thick) mounted 0.25 inches away from the intake manifold 13 and exhaust manifold 14. The node plates are drilled with the same hole pattern as intake manifold 13 and exhaust manifold 14. The node plates are slipped over the tubes and brazed to the tubes 21 through 32 at the same time that the tubes are brazed into the intake manifold 13 and exhaust manifold 14.

In the case of the 12 tube CMF, the node plates would be annular plates with, for example, twelve (12) equally spaced holes. Two node plates are required for each CMF with each node plate brazed a short distance away from the intake manifold 13 and exhaust manifold 14. These plates are referred to as node plates since the bending and the deflection of all of the flow tubes 21 through 32 is minimized at the cross-section where the tubes intersect the node plates. The use of node plates makes the tube structure more rigid at the location where no relative movement of the tubes is desired. The benefit is that a higher "Q" is achieved at the resonant frequency of the vibrating tubes or, in other words, less structural damping. The higher "Q" means less energy is required to drive the vibrating tubes at resonance.

In yet another embodiment, the shape of the profile of each bent tube could take many forms. The tube shape could have the form of a "bow tie" with the tube termination at the intake manifold 13 or exhaust manifold 14 being in a radial direction. The shape of each tube could be in the form of a one turn coil or "trumpet shaped" coil having the advantage of additional tube flexibility packaged within a small space.

In another embodiment, the alternating current through the driver coil 51 is 180 degrees out-of-phase with the current through coil 52. When the current is 180 degrees out-of-phase through the driver coils 51 and 52, another oscillating mode, or twisting motion of the tubes 21 through 32 is induced. When the tubes are forced into a twisting motion, the Coriolis forces increase the mean amplitude of the angular displacement. That is, when the driver coils are driven 180 degrees out-of-phase, the magnitude of the mean angular displacement increases with an increase in flow rate. In such a configuration, bending of the tubes due to Coriolis forces is less than the bending obtained from in phase excitation of the tubes.

Many other modifications, additions and/or subtractions from the illustrated embodiments may be made without departing from the spirit or scope of the invention, which is indicated by the appended claims and equivalents thereto. For example, the number of tubes can be increased to 24 or more, or reduced to as few as 4. A design of six tubes, using two sets of 3 tubes, spaced 120° apart is also envisioned. The present invention could also be used not only for flow measurement, but because of its high accuracy, also to measure the density of the materials flowing therethrough.

I claim:

1. A mass flow rate meter using Coriolis force for measuring the mass flow rate of liquid flow through the meter comprising:

an inlet and outlet manifold forming a central hub;

two or more sets of tubes, said tubes spaced around said central hub, each of said tubes having an inlet and an outlet end coupled respectively to said inlet and outlet manifold so as to permit said liquid flow from said inlet manifold to said outlet manifold, respectively;

a plurality of plates, each of said plates rigidly interconnecting the tubes forming one of said sets of tubes;

driving means coupled to said plates for inducing harmonic oscillations in said sets of tubes through said plates; and sensing means for sensing relative motion induced in said tubes by the flow of a liquid there through to a provide a measurement indicative of the mass flow rate through said tubes.

2. A flowmeter as claimed in claim 1 further comprising an outer case, covering, but not touching said tubes hermetically mated to said inlet and outlet manifold so as to exclude ambient air from contact with said tubes.

3. A flowmeter as claimed in claim 1 wherein said driving means and said sensing means are located in diametrically opposed positions on said plates.

4. A flowmeter as claimed in claim 1 further comprising a temperature sensor for temperature sensing of said flowmeter.

5. A flowmeter as claimed in claim 1 wherein said sensing means are linear variable differential transformers.

6. A flowmeter as claimed in claim 2 wherein the cavity defined by said outer case covering said tubes is filled with a mixture of helium and nitrogen.

7. A flowmeter as claimed in claim 2 further comprising a hermetic electrical connector mounted on said outer case for providing electrical circuit continuity to said sensing and driving means.

8. A mass flow rate meter using Coriolis force for measuring the mass flow rate of liquid flow through the meter comprising:

an inlet and outlet manifold forming a central hub;

two or more sets of tubes, said tubes being equally spaced symmetrically around said central hub, each of said tubes having an inlet and an outlet end coupled respectively to said inlet and outlet manifold so as to permit said liquid flow from said inlet manifold to said outlet manifold, respectively;

a plurality of plates, each of said plates rigidly interconnecting the tubes forming one of said sets of tubes;

driving means coupled to said plates for inducing harmonic oscillations into said sets of tubes through said plates; and sensing means for sensing relative motion induced in said tubes by the flow of a liquid there through to provide a measurement indicative of the mass flow rate through said tubes.

9. A flowmeter as claimed in claim 8 further comprising an outer case, covering, but not touching said tubes hermetically mated to said inlet and outlet manifold so as to exclude ambient air from contact with said tubes.

10. A flowmeter as claimed in claim 5 wherein said driving means and said sensing means are located in diametrically opposed positions on said plates.

11. A mass flow rate meter using Coriolis force for measuring the mass flow rate of liquid flow through the meter having an axial axis of symmetry comprising:

an inlet and outlet manifold axially collocated along said axial axis of symmetry forming a central hub;

two or more sets of tubes, said tubes spaced around said central hub, each of said tubes having an inlet and an outlet end coupled respectively to said inlet and outlet manifold so as to permit said liquid flow from said inlet manifold to said outlet manifold, respectively;

a plurality of plates, each of said plates rigidly interconnecting the tubes part of one of said sets of tubes thereby forming an assembly balanced around said axial axis of symmetry of said flow meter;

driving means coupled to said plates for inducing harmonic oscillations into said sets of tubes through said plates; and sensing means for sensing relative motion induced in said tubes by the flow of a liquid there through to a provide a measurement indicative of the mass flow rate through said tubes, said sensing means and driving means also forming an assembly balanced around said axial axis of symmetry of said flow meter.

12. A flowmeter as claimed in claim 11 further comprising an outer case, covering, but not touching said tubes hermetically mated to said inlet and outlet manifold so as to exclude ambient air from contact with said tubes.

13. A flowmeter as claimed in claim 11 wherein said driving means and said sensing means are located in diametrically opposed positions on said plates.

14. A flowmeter as claimed in claim 11 wherein said tubes and plates are balanced statically and dynamically around the axial axis of symmetry of said flowmeter.

15. A mass flow rate meter using Coriolis force for measuring the mass flow rate of liquid flow through the meter having an axial axis of symmetry comprising:

an inlet and outlet manifold axially collocated along said axial axis of symmetry forming a central hub;

two or more sets of tubes, said tubes being equally spaced symmetrically around said central hub, each of said tubes having an inlet and an outlet end coupled respectively to said inlet and outlet manifold so as to permit said liquid flow from said inlet manifold to said outlet manifold, respectively;

a plurality of plates, each of said plates rigidly interconnecting the tubes part of one of said sets of tubes thereby forming an assembly balanced around said axial axis of symmetry of said flow meter;

driving means coupled to said plates for inducing harmonic oscillations into said sets of tubes through said plates; and sensing means for sensing relative motion induced in said tubes by the flow of a liquid there through to a provide a measurement indicative of the mass flow rate through said tubes, said sensing means and driving means also forming an assembly balanced around said axial axis of symmetry of said flow meter.

16. A flowmeter as claimed in claim 15 further comprising an outer case, covering, but not touching said tubes hermetically mated to said inlet and outlet manifold so as to exclude ambient air from contact with said tubes.

17. A flowmeter as claimed in claim 15 wherein said driving means and said sensing means are located in diametrically opposed positions on said plates.

18. A flowmeter as claimed in claim 15 wherein said tubes and plates are balanced statically and dynamically around the axial axis of symmetry of said flowmeter.

* * * * *